United States Patent [19]

Carswell

[11] Patent Number: 5,069,093
[45] Date of Patent: Dec. 3, 1991

[54] METHOD AND APPARATUS FOR FORMING AN INCOMPLETE HOLE IN A WORKPIECE

[75] Inventor: Charles W. Carswell, Marshall, N.C.

[73] Assignee: Dana Corporation, Toledo, Ohio

[21] Appl. No.: 277,800

[22] Filed: Nov. 30, 1988

[51] Int. Cl.⁵ .............................................. B23B 1/00
[52] U.S. Cl. .................................. 82/1.11; 408/1 R; 408/54; 408/103; 408/224
[58] Field of Search ............... 409/132; 408/62-64, 408/66, 713, 103, 200, 223, 224, 189, 191, 1 R, 54; 269/47, 52, 243, 287, 285; 82/1.11

[56] References Cited

U.S. PATENT DOCUMENTS

| 18,088 | 9/1857 | Deal et al. ...................... 408/54 |
| 216,023 | 6/1879 | Crane . |
| 726,662 | 4/1903 | Ensign .................... 408/66 |
| 1,229,565 | 6/1917 | Ahlgren . |
| 1,244,953 | 10/1917 | Budlong . |
| 1,546,062 | 7/1925 | Edmunds ................ 408/54 |
| 2,053,253 | 9/1936 | Dennis et al. . |
| 2,260,784 | 10/1941 | Morton .................. 408/103 |
| 2,358,608 | 9/1944 | Turner . |
| 2,429,382 | 10/1947 | Wilson . |
| 2,649,818 | 8/1953 | Kaiser . |
| 3,228,265 | 1/1966 | Stoddard et al. . |
| 3,647,307 | 3/1972 | Kosker . |
| 4,105,360 | 8/1978 | Keller . |
| 4,124,328 | 11/1978 | Hopkins . |
| 4,210,406 | 7/1980 | Berry, Jr. . |
| 4,265,574 | 5/1981 | Eckle . |
| 4,505,626 | 3/1985 | Benhase . |
| 4,564,321 | 1/1986 | Kondo et al. . |
| 4,730,958 | 3/1988 | Banoczky ....................... 408/54 |

FOREIGN PATENT DOCUMENTS 3202031 9/1982 Fed. Rep. of Germany ...... 408/226
3610016 10/1987 Fed. Rep. of Germany ... 408/713 X Primary Examiner—Larry I. Schwartz
Assistant Examiner—Robert Schultz
Attorney, Agent, or Firm—MacMillan, Sobanski & Todd

[57] ABSTRACT

A method and apparatus for removing metal from a workpiece so as to form an incomplete hole therein is disclosed. The tool includes a shank having a plurality of cutting inserts adjustably attached to one end thereof. The cutting inserts are axially spaced apart from one another along the tool shank by a predetermined distance which is greater than the thickness of the workpiece. The first cutting insert functions as a drill or end mill to form a rough incomplete hole through the workpiece, while the second cutting insert functions as a boring tool to finish the incomplete hole. An opposite end of the tool shank is retained within a bore formed in a tool holder. The tool holder is supported within a conventional rotational means, such as a lathe. Both the opposite end of the tool shank and the bore formed in the tool holder are formed eccentrically to provide maximum flexibility in adjusting the rotational axis of the cutting inserts and, therefore, the diameter of the incomplete hole being formed.

2 Claims, 1 Drawing Sheet

METHOD AND APPARATUS FOR FORMING AN INCOMPLETE HOLE IN A WORKPIECE

BACKGROUND OF THE INVENTION

This invention relates in general to tools for selectively removing material from metallic workpieces and in particular to a combined rough and finish metal cutting tool for forming an incomplete hole in a workpiece.

One of the oldest known and widely used manufacturing processes concerns the selective removal of material from a metallic workpiece. Many different tools are known for removing metal in various manners, such as by cutting, drilling, boring, and the like. A large number of such tools are specifically designed to remove metal in such a manner as to form a complete hole (i.e., a hole having a circular cross section, the diameter of which extends entirely within the workpiece) in the workpiece. The hole may extend completely through the workpiece, as with drilling, or it may extend only partially through the workpiece, as with counterboring. In either event, it is known to provide two or more of such metal removing tools on a single tool shank or support so that two metal removing operations may be performed with a single pass thereof. For example, the first metal removing operation may be the formation of a complete hole in the workpiece, while the second metal removing operation may be the formation of a counterbore co-axially aligned with the hole at the surface of the workpiece.

In some instances, rather than forming a complete hole in a workpiece, it is desirable to form an incomplete hole therein. An incomplete hole is a hole formed adjacent an edge of the workpiece such that a portion of such edge interrupts the otherwise circular cross section of the hole. In other words, a portion of the diameter of the hole being formed extends beyond the surface of the workpiece, resulting in an incomplete circular cross section. For example, in a vehicle differential case formed from two mating halves, incomplete holes having semi-circular cross sections may be formed in the opposite sides of each of the two halves. When the halves are secured together, the semi-circular incomplete holes are aligned to form opposed complete holes through the differential case so as to permit axle shafts to extend therethrough.

The formation of an incomplete hole in a workpiece poses certain difficulties which are not encountered in the formation of a complete hole. In particular, since the metal removing tool is not completely surrounded by the workpiece, as it is when a complete hole is being formed, the workpiece tends to deflect the tool sideways away from the workpiece and, therefore, away from desired axis of movement of the tool. This side loading of the tool is particularly troublesome when more than one tool is mounted on a single shank. In these instances, it has been found to be quite difficult to maintain precision in the removal of metal from the workpiece and still maintain a relatively fast and efficient operation.

SUMMARY OF THE INVENTION

This invention relates to an improved method and apparatus for removing metal from a workpiece so as to form an incomplete hole therein. The tool includes a shank having a plurality of cutting inserts adjustably attached to one end thereof. The cutting inserts are axially spaced apart from one another along the tool shank by a predetermined distance which is greater than the thickness of the workpiece. The first cutting insert functions as a drill or end mill to form a rough incomplete hole through the workpiece, while the second cutting insert functions as a boring tool to finish the incomplete hole. An opposite end of the tool shank is retained within a bore formed in a tool holder. The tool holder is supported within a conventional rotational means, such as a lathe. Both the opposite end of the tool shank and the bore formed in the tool holder are formed eccentrically to provide maximum flexibility in adjusting the rotational axis of the cutting inserts and, therefore, the diameter of the incomplete hole being formed.

It is an object of the invention to provide an improved combined rough and finish metal cutting tool for forming an incomplete hole in a workpiece.

It is another object of the invention to provide such a tool which is easily and quickly adjustable to provide different cutting diameters.

It is a further object of the present invention to provide such a tool which is relatively simple and inexpensive.

Other objects and advantages of the invention will become apparent to those skilled in the art from the following detailed description of the preferred embodiment, when read in light of the accompanying drawings.

DETAILED DESCRIPTION OF THE PREFERRED EMBODIMENT

Figure 1:
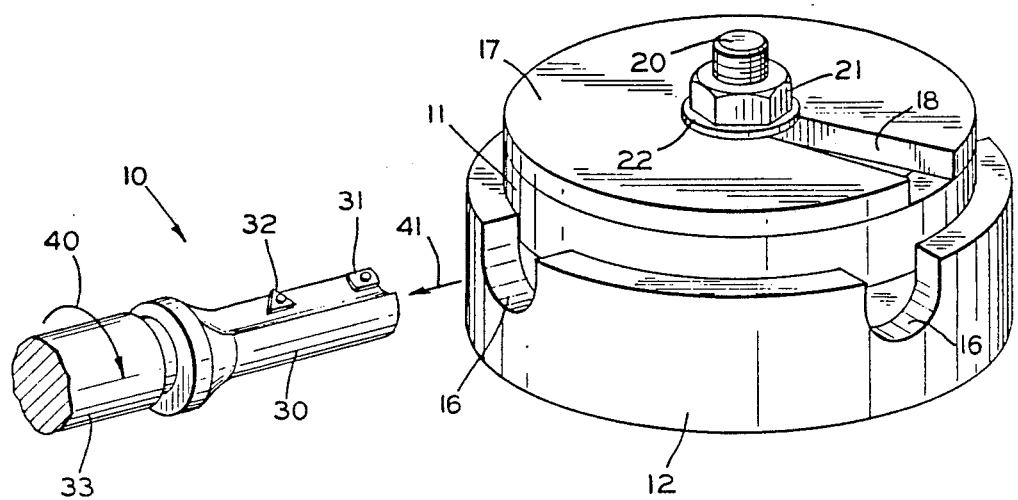
FIG. 1 is a perspective view of a portion of a tool for forming an incomplete hole in a workpiece in accordance with the invention.

Referring now to the drawings, there is illustrated a portion of a tool, indicated generally at 10, for forming an incomplete hole in a workpiece 11 in accordance with the invention. In the illustrated embodiment, the workpiece 11 is an annular metallic member which may, for example, form a portion of a vehicle differential housing. However, the workpiece 11 may be formed in other shapes and may be adapted for other uses than as specifically shown.

Figure 2:
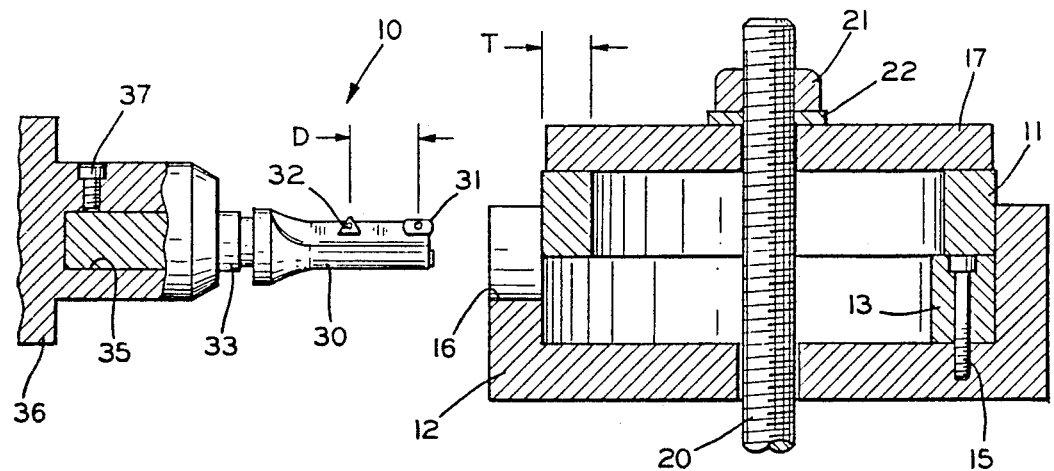
FIG. 2 is a side elevational view of the tool and workpiece illustrated in FIG. 1.

In order to form the desired incomplete hole therein, the workpiece 11 is initially placed within a support 12. As best shown in FIG. 2, the support 12 is generally hollow and cylindrical in shape, having an upper opened end and a lower closed end. The inner diameter of the support 12 is slightly larger than the outer diameter of the workpiece 11, thereby permitting the workpiece 11 to be received therein but preventing sideways movement of the workpiece 11 relative to the support 12. The workpiece 11 is supported by one or more conventional spacers 13 disposed within the support 12. The spacers 13 are generally cylindrical in shape and may be secured to the lower closed end of the support 12 by respective threaded fasteners 15 in order to prevent relative movement therebetween. The spacers 13 support the workpiece 11 above the lower closed end of the support 12.

One or more semi-circular recesses 16 are pre-formed through the cylindrical side of the support 12 adjacent to the upper open end thereof. The recesses 16 are located approximately where the incomplete holes are to be formed through the workpiece 11 by the tool 10. As will be explained in greater detail below, the recesses 16 provide space for the passage of the tool 10 therethrough into engagement with the workpiece 11. Thus, the recesses 16 may have any shape, so long as they do not interfere with the passage of the tool 10.

The spacers 13 support the workpiece 11 such that the lower edge thereof is positioned well above the lowest portions of the recesses 16. Thus, the lower edge of the workpiece 11 is exposed to the tool 10 through the recesses 16, as shown in FIGS. 1 and 2. The workpiece 11 is retained within the support 12 by a hold down plate 17 which extends across the upper surface thereof. The hold down plate 17 has a slot 18 formed therein extending from the center to the peripheral edge thereof, the purpose of which will be explained below.

A threaded stud 20 extends upwardly from the lower closed end of the support 12 through the slot 18 formed in the hold down plate 17. The stud 20 may be secured directly to the support 12 or to some other member (not shown) which is connected thereto. A nut 21 is threaded onto the upper end of the stud 20, and a washer 22 is disposed between the nut 21 and the hold down plate 18. When it is desired to retain the workpiece 11 within the support 12 to begin the formation of an incomplete hole, the nut 21 is rotated in one direction such that it and the washer 22 engage the upper surface of the hold down plate 17. Thus, the nut 21 urges the hold down plate 18 downwardly against the upper edge of the workpiece 11, thereby firmly securing it within the support 12. Later, when the incomplete hole or holes have been formed and it is desired to remove the workpiece 11, the nut 21 is loosened by rotating it in the opposite direction. The hold down plate 17 may then be removed without removing the nut 21 from the stud 20 by sliding the hold down plate 17 sideways such that the stud 20 passes through the slot 18. This significantly reduces the amount of time required to replace a machined workpiece 11 with another workpiece 11.

The structure of the tool 10 is best illustrated in FIG. 2. As shown therein, the tool 10 includes a shank 30 having a pair of cutting inserts 31 and 32 attached to one end thereof. The first cutting insert 31 is attached to the shank 30 at the tip thereof, while the second cutting insert 32 is attached a predetermined distance therefrom. The particular position at which the second cutting insert 32 is attached may be adjusted axially along the length of the tool according to the size of the workpiece 11, as will be described below. The cutting inserts 31 and 32 are conventional in the art and are mounted on the shank 30 in such a manner that the first cutting insert 31 acts as a drilling or end milling point and the second cutting insert 32 acts as a boring point.

The tool shank 30 has a opposite end 33 which extends axially away from the one end upon which the cutting inserts 31 and 32 are attached. This opposite end 33 is ground or otherwise formed eccentrically with respect to the longitudinal axis of the tool shank 30. The opposite end 33 of the tool shank 30 is received within a bore 35 formed in a tool holder 36. One or more conventional threaded fasteners 37 are provided in the tool holder 36 for selectively engaging and retaining the opposite end 33 of the tool shank 30 within the bore 35. The bore 35 is formed eccentrically with respect to the longitudinal axis of the tool holder 36. The tool holder 36 is adapted to be secured to any conventional means for rotating the tool holder 36 and the tool shank 30, such as the spindle of a lathe (not shown) or similar machine.

By loosening the threaded fasteners 37 and rotating the tool shank 30 within the tool holder 36, the axis of rotation defined by the movement of the cutting inserts 31 and 32 when the tool holder 36 is rotated can be adjusted from being co-axial with the axis of rotation of the tool holder 36 to being offset a predetermined distance therefrom. The eccentric formation of both the opposite end 33 of the tool shank 30 and the bore 35 in the tool holder 36 provides maximum flexibility in such adjustment of the tool 10, more than would otherwise be available than if only one of the opposite end 33 of the tool shank 30 or the bore 35 in the tool holder 36 were eccentrically formed.

As best shown in FIG. 2, the tool shank 30 is positioned such that when it is rotated, the cutting inserts 31 and 32 are moved through a circular path relative to the workpiece 11. The diameter defined by this movement extends both partially above and partially below the lower edge of the workpiece 11. By positioning the tool shank 30 in this manner, an incomplete hole will be formed through the workpiece 11, as described below.

As is known in the art, the tool 10 is adapted to be rotated relative to the workpiece 11, as shown by the arrow 40 in FIG. 1, by the lathe. While the tool 10 is rotated, the support 12 and the tool 10 are moved relatively toward one another, usually by advancing the support 12 toward the rotating tool 10, as shown by the arrow 41 in FIG. 1. The support 12 is attached to and forms a part of the means for moving, which is conventional in the art. The support 12 is advanced in this manner such that the first cutting insert 31 engages the outer peripheral surface of the workpiece 11. As mentioned above, the first cutting insert 31 functions as a drill or end mill to form a roughly sized incomplete hole through the lower end of the workpiece 11.

As shown in FIG. 2, the cutting inserts 31 and 32 are spaced apart from one another along the axial length of the tool shank 30 by a predetermined distance indicated as "D". The distance "D" is greater than the thickness of the workpiece 11, which is indicated as "T". This relationship between the distance "D" between the cutting inserts 31 and 32 and the thickness "T" of the workpiece 11 is important because it is undesirable for both of the cutting inserts 31 and 32 to be engaging the workpiece 11 at the same time. If this were to occur, the side loading forces applied to the tool shank 30 by the workpiece 11 would deflect the tool 10 sideways, away from the workpiece 11. As a result, the cutting inserts 31 and 32 would not remove material from desired locations of the workpiece 11.

By spacing the first and second cutting inserts 31 and 32 in this manner, the first cutting insert 31 passes completely through the workpiece 11 before the second cutting insert 32 begins to engage the workpiece 11. As mentioned above, the second cutting insert 31 functions as a boring tool to finish the incomplete hole made by the first cutting insert 31. The second cutting tool 32 finishes the roughly sized incomplete hole formed by the first cutting tool 31 to a precise size. When the second cutting insert 32 has passed completely through the workpiece 11, the support 12 is retracted in the opposite direction from the arrow 41. The support 12 can then be rotated to re-align the workpiece 11 relative to the tool 10 for the formation of a second incomplete hole therein. Alternatively, the workpiece 11 may be removed as described above to permit a new workpiece 11 have such an incomplete hole formed therein.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A method for forming an incomplete hole in a workpiece having a finished dimension comprising the steps of:
    (a) providing a region in the workpiece adjacent to an edge thereof with a predetermined thickness;
    (b) providing a tool defining an axis of rotation;
    (c) attaching a first cutting means at a location on the tool such that a cutting edge thereof is located a first predetermined distance from the rotational axis of the tool;
    (d) attaching a second cutting means at a location on the tool such that a cutting edge thereof is located a second predetermined distance from the rotational axis of the tool, the second predetermined distance being greater than the first predetermined distance, said attachment location of the second cutting means being spaced apart from said attachment location of the first cutting means by an axial distance along the tool which is greater than the predetermined thickness of the region of the workpiece;
    (e) rotating the tool about the axis such that the first and second cutting means are moved in circular paths relative to the workpiece;
    (f) orienting the tool on a projected linear path which will provide for the circular paths of movement of the first and second cutting means to overlap the edge of the workpiece when said tool passes along said linear path;
    (g) providing a hollow movable support having a recess formed therethrough adjacent to one end thereof;
    (h) supporting the workpiece within the support such the region of the workpiece where the incomplete hole is to be formed is exposed to the tool through the recess; and
    (i) moving the tool relative to the workpiece along said linear path and into engagement with the workpiece so that the first and second cutting means pass through the workpiece to form the incomplete hole, the first cutting means passing completely through the workpiece to form an incomplete hole having a rough dimension before the second cutting means passes through the workpiece to form the incomplete hole having a finished dimension.

2. The invention defined in claim 1 further including the steps of providing a spacer within the support and supporting the workpiece within the support on the spacer.

* * * * *